March 2, 1937.  W. J. WOODCOCK  2,072,325
DUPLEX VALVE APPLIED TO A SINGLE CYLINDER
Original Filed Nov. 14, 1931  2 Sheets-Sheet 1
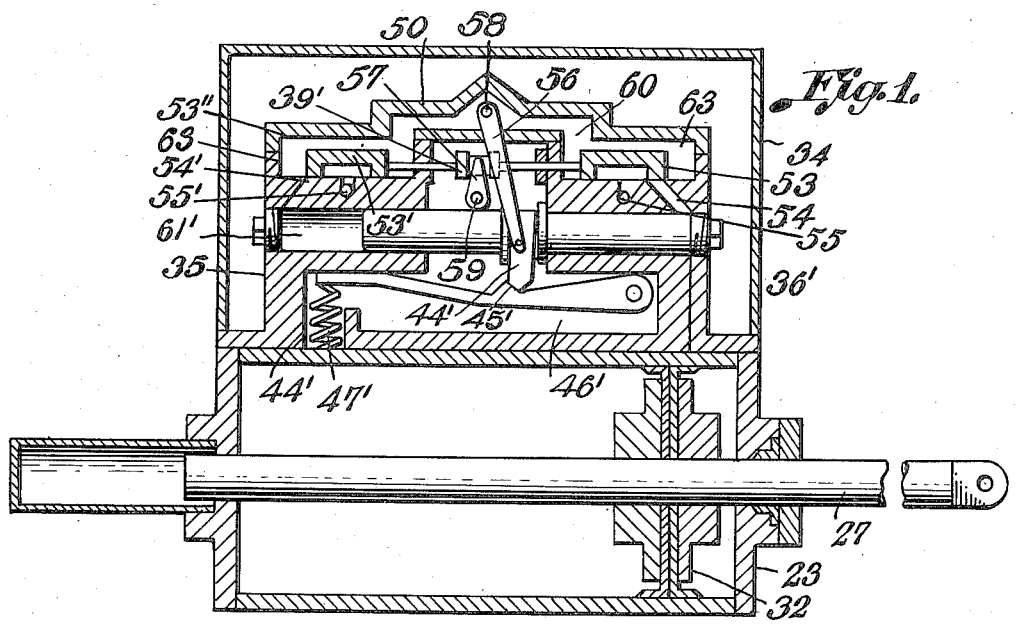
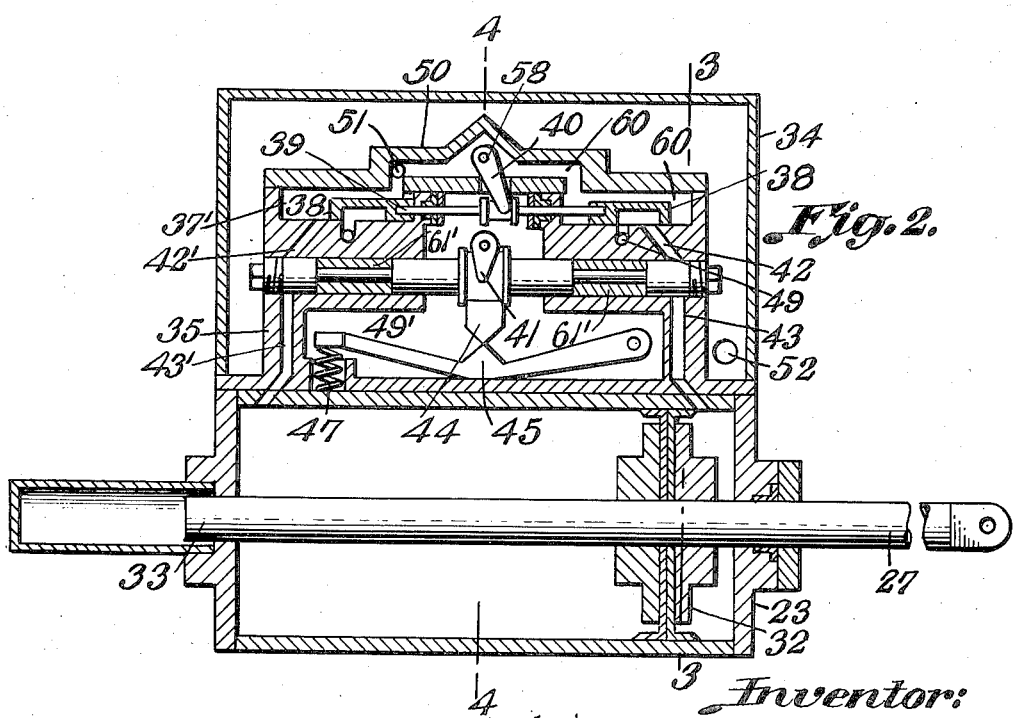

March 2, 1937. W. J. WOODCOCK 2,072,325
DUPLEX VALVE APPLIED TO A SINGLE CYLINDER
Original Filed Nov. 14, 1931 2 Sheets-Sheet 2
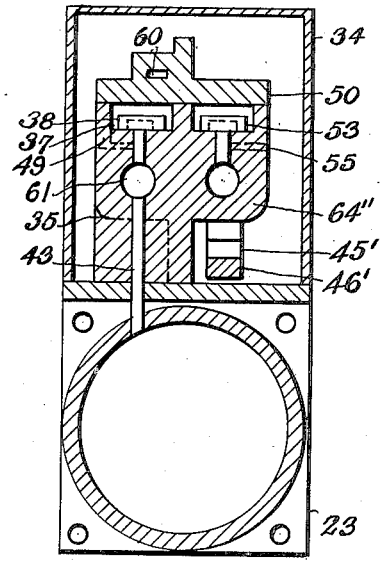
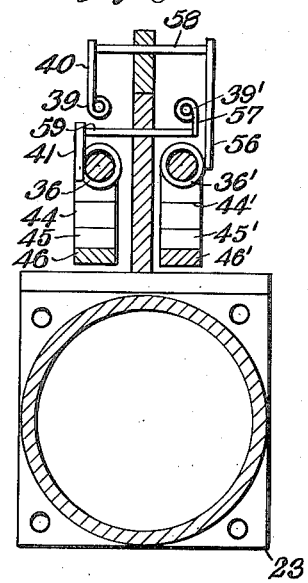
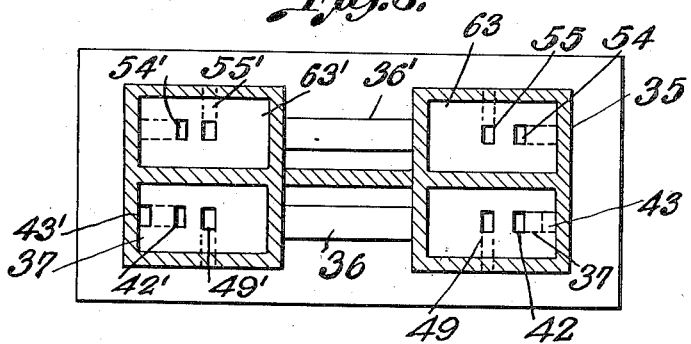
Inventor:
Willard J. Woodcock
By Augusta A. Woodcock
Executrix
By Howard Freeman
her attorney Patented Mar. 2, 1937

2,072,325

UNITED STATES PATENT OFFICE 2,072,325

DUPLEX VALVE APPLIED TO A SINGLE CYLINDER

Willard Jay Woodcock, Brooklyn, N. Y.; Augusta A. Woodcock executrix of said Willard J. Woodcock, deceased, assignor to Augusta A. Woodcock, Brooklyn, N. Y.

Original application November 14, 1931, Serial No. 575,109. Divided and this application May 26, 1933, Serial No. 673,007

1 Claim. (Cl. 121—150)

This invention relates to a valve to reliably operate a single cylinder, with a reciprocating piston, to reverse when the piston becomes stalled.

The present method, is to operate the valve of a single cylinder with a reciprocating piston, by connecting it to the piston rod.

It is evident, that when the piston rod becomes stalled, that the machine will cease to work, and therefore impractical for some service, especially for a domestic stoker.

The objects of this invention are to produce a more reliable valve for single cylinders in general to produce a valve that will operate a single cylinder, with a reciprocating piston that will reverse when the piston becomes stalled; reversing the piston generally releases the cause of obstruction, which falls out or if the nature of a clinker will be crushed, after a few impulses of a ram, and then resume its operation without attention. In other words it does not require service, which is quite necessary for domestic equipment. This desirable result, can be accomplished as subsequently shown.

The method of obtaining these results is illustrated in the accompanying drawings.

Fig. 1 is a sectional elevation of the right side of the duplex valve.

Fig. 2 is a sectional elevation of the left side of the duplex valve.

Fig. 3 is a cross section of the duplex valve through 3—3, Fig. 2, and shows the piston chambers, the working cylinder, and port connection to the same, only the port from the left side of the valve connects to the working cylinder.

Fig. 4 is a cross section through 4—4, Fig. 2, and shows the valve body with cross over arrangement of levers and rockshafts whereby the right side piston operates the left side valves, and the left side piston operates the right side valves.

Fig. 5 is a plan of the valve seats and ports of the duplex valve. A description of this duplex valve in which all numerals refer to like parts is as follows:

Reference being made to Figures 1 and 2, in which Fig. 1 is the right side and Fig. 2 is the left side of the valve and as they interconnect they can best be described jointly. 23 is a working cylinder with a reciprocating piston rod 27, to which is fast the piston 32, a tail rod 33, makes a complete unit and no crosshead and ways are necessary. 34 is a case which encloses the valve body 35, which is provided with piston chambers 61, 61′ Fig. 3, in which reciprocate piston 36 on the left side, and piston 36′, on the right side, the cover 50 includes the port 60, and inlet connection 51, and covers all the valve chests 37, 37′, 63, 63′ as shown in Fig. 5, and in which the slide valves 38, 38′, 53, 53′ work, and the pressure ports in the valve seats are shown, 42, 42′, 54, 54′ and also the exhaust ports 49, 49′, 55, 55′. The valves 38, 38′ are attached to valve rod 39, and the valves 53, 53′ are attached to the valve rod 39′, on the right side, the lever 40, is fast to the rockshaft 58, and also lever 56 as is shown in Fig. 4, and lever 57, is fast to the rockshaft 59, as is also lever 41, this makes the cross over so that the left side piston 36, operates the right side valves 53, 53′, and the piston 36′, on the right side operates the left side valves 38, 38′. 47, is a resistance spring on the left side, 46 is a spring lever with the angle block 45 fast on it, and 44 is a cross head fast on the piston 36. These blocks must pass each other before the piston 36 can complete its travel and overcome the tension of the spring 47, this same arrangement is also on the right side, 47′, 46′, 45′, 44′ and performs the same work.

Having thus described the device the operation is as follows:

Pressure enters the valve at 51, Fig. 2, from any suitable source and passes through port 60, to supply pressure chests 37, 37′, Fig. 2, and also pressure chests 63, 63′ Fig. 1.

In Fig. 2 the valves 38, 38′ are at the extreme travel towards A and port 42′ will be open, admitting pressure to pass the end of piston 36 and pass through the port 43′, to the working cylinder 23, and against piston 32, and forces it to the end of the stroke towards A. As shown it has reached the end of its stroke and the pressure has built up until it has forced piston 36, to the center of its stroke towards A and now it will soon finish. In doing this the lever 41, Fig. 2, engaged with the piston 36, and is fast to the rockshaft 59, below the valve stems 39, 39′, the rockshaft 59, is also fast to the lever 57, Fig. 1, and engages with valve rod 39′, to which valves 53, 53′ are attached, and when piston 36, Fig. 2 is at the end of its movement towards A the valves 53, 53′ will be at the end of their movement towards B opening port 54.

The pressure will now be admitted at the end of piston 36′, and move it up to the resistance at angle block 45′ and cross head 44′.

As the right side of Figure 1 does not connect to the working cylinder 23, the pressure quickly builds up and overcomes the resistance of spring 47′ by means of the spring lever 46′ to which angle block 45′ is fast, and contacting with 44′, which is fast to piston 36′, which continues its stroke towards B. The lever 56 is fast on rock-shaft 58, and is also fast to lever 40 on the left side of Figure 2. Lever 56 engages with piston 36' and moved with it and lever 40 on the same rock-shaft, and engages with the valve rod 39, on the left side of Figure 2. The valves 38—38' are attached to this valve rod. As rock-shaft 58 is located above the valve rods 39—39', the valve stem 39 travels in the same direction as piston 36' on the right side of Figure 1. Therefore, when the piston 36' is at its full stroke towards B, the valves 38—38' on the left side of Figure 2, will also be at their extreme travel towards B. When in this position the port 42 will be open and pressure will pass by the end of piston 36, and through port 43, into the working cylinder 23, and force the working piston 32 towards B. And then the pressure will build up and force piston 36 over the resistance caused by spring 47 and to the end of its stroke towards B. The case 34 covers the entire duplex valve and forms a reservoir. The exhaust from valves 38—38' on the left side of Figure 2 exhaust through ports 49—49' into this case, and on the right side of Figure 1 the valves 53—53' exhaust through ports 55—55' into this same case. Therefore, there is a pipe connection in the case at 52 Figure 2 to carry away the total exhaust from the duplex valve.

There are many uses to which this valve may be applied and I do not limit myself to this form of construction.

The introduction of a resistance in the duplex valve principle produces a new result in mechanical movement.

Having thus described my invention,

What I claim as new is:

In a valve device for a power circuit consisting of a casing, a plurality of chambers therein, each of said chambers provided with ports, a plurality of piston members to work in said chambers, valve means operable by number one piston member to open and close number two chamber ports, and valve means operable by number two piston member to open and close number one chamber ports, resistance means applied to said piston members, which must be overcome by pressure, before a piston member can complete its stroke.

WILLARD JAY WOODCOCK.